United States Patent
Pauli

(10) Patent No.: US 6,555,797 B2
(45) Date of Patent: Apr. 29, 2003

(54) FULLY SUBMERSIBLE IMMERSION HEATER

(75) Inventor: Jean Luc Pauli, Lyons (FR)

(73) Assignee: Rena France, Annecy Cedex (FR)

( * ) Notice: Subject to any disclaimer, the term of this patent is extended or adjusted under 35 U.S.C. 154(b) by 0 days.

(21) Appl. No.: 09/769,228

(22) Filed: Jan. 25, 2001

(65) Prior Publication Data

US 2001/0045425 A1 Nov. 29, 2001

Related U.S. Application Data

(60) Provisional application No. 60/178,091, filed on Jan. 26, 2000.

(51) Int. Cl.[7] ............................. A01K 63/06; H05B 3/80
(52) U.S. Cl. ........................................ 219/497; 219/523
(58) Field of Search ................................ 219/497, 523, 219/534, 544

(56) References Cited

U.S. PATENT DOCUMENTS

| | | | | |
|---|---|---|---|---|
| 3,746,836 A | * | 7/1973 | Summerfield et al. ...... | 219/523 |
| 4,107,514 A | * | 8/1978 | Ellson ........................ | 219/523 |
| 4,358,667 A | * | 11/1982 | Johnson et al. ............. | 219/523 |
| 4,983,813 A | * | 1/1991 | van Tulleken et al. ...... | 219/523 |
| 5,392,380 A | * | 2/1995 | Tsai ............................ | 219/523 |
| 5,568,587 A | * | 10/1996 | Marioni ...................... | 219/523 |
| 5,834,741 A | * | 11/1998 | Tseng ......................... | 219/523 |

FOREIGN PATENT DOCUMENTS

| EP | 543655 | * | 5/1993 |
| GB | 1449629 | * | 9/1976 |

* cited by examiner

*Primary Examiner*—Joseph Pelham
(74) *Attorney, Agent, or Firm*—Akin Gump Strauss Hauer & Feld, L.L.P.

(57) ABSTRACT

A fully submersible immersion heater having reduced dimensions. The immersion heater includes a waterproof housing, an electric heating element, a thermostat, an end cap, a temperature control, a power cable and a sheath. The waterproof housing has an opening at one end. The electric heating element, which generates a heat output, is placed inside of the housing. The thermostat is also placed inside of the housing. The thermostat is electrically connected to the heating element for regulating the heat output of the heating element. The end cap sealingly engages the opening in the housing to form a watertight seal between the end cap and the opening in the housing. The end cap has a first conduit and a second conduit that extend through the end cap from a first surface of the end cap outside of the housing to a second surface of the end cap inside of the housing. The temperature control, which controls the thermostat, is seated adjacent to the second conduit. The temperature control is operatively connected to the thermostat by a shaft extending through the second conduit. The shaft sealingly engages the second conduit to form a watertight seal between the shaft and the second conduit. The flexible, water-resistant power cable, which has an outer surface, extends from outside of the housing through the first conduit and is electrically connected to the thermostat inside of the housing. The power cable supplies electrical power to the heating element. The sheath is molded onto the power cable and has an outer surface that is shaped to be complementarily received by the first conduit. The sheath forms a watertight seal with the outer surface of the supply cable and sealingly engages the first conduit to form a watertight seal between the sheath and the first conduit.

2 Claims, 5 Drawing Sheets

Fig. 3
*(Prior Art)*
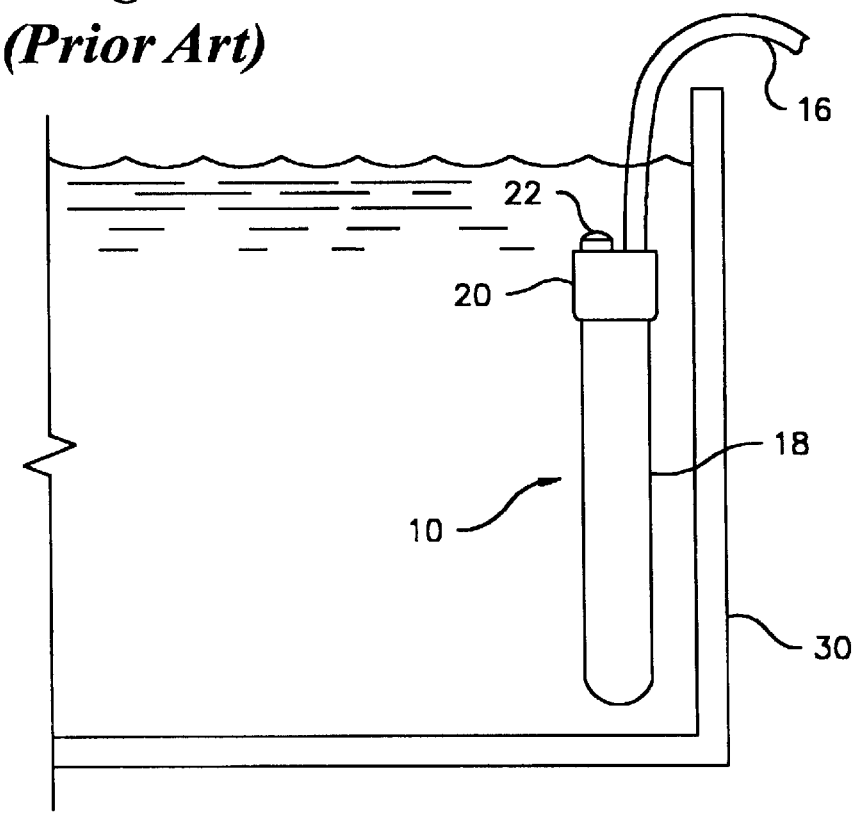
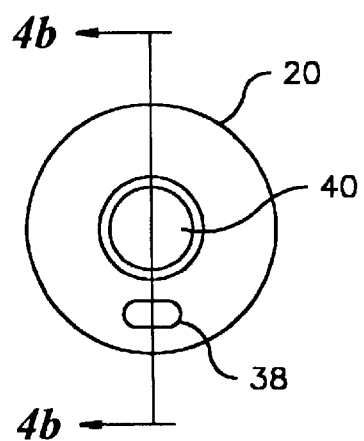
Fig. 4a
*(Prior Art)*
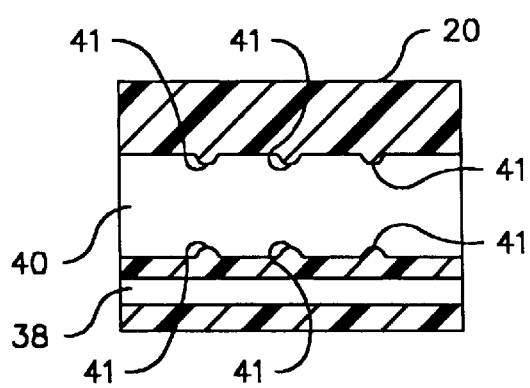
Fig. 4b
*(Prior Art)*

US 6,555,797 B2

1

FULLY SUBMERSIBLE IMMERSION HEATER

CROSS-REFERENCE TO RELATED APPLICATIONS

The present application is based on and claims the benefit of U.S. Provisional Application Serial No. 60/178,091, filed Jan. 26, 2000, entitled "FULLY SUBMERSIBLE IMMERSION HEATER."

BACKGROUND OF THE INVENTION

The present invention relates to the field of immersion heaters. More particularly, the present invention relates to a fully submersible immersion heater having reduced dimensions that is used primarily, but not exclusively, for heating and maintaining the water temperature of an aquarium.

Immersion heaters are known for various purposes, including heating and maintaining the temperature of water in aquariums. As shown in FIG. 1, a typical immersion heater 10 is made up of a heating element 12, a thermostat 14, a power supply cable 16, a waterproof housing 18, an end cap 20, and a temperature control 22. The heating element 12, which is usually a thermal resistance, is electrically connected by one or more wires 13 to the thermostat 14. The thermostat 14, which is typically a thermostatic bimetal camber, is used to regulate the heat output of the heating element 12. The thermostat 14 is in turn electrically connected to the supply cable 16, which supplies power to the heating element 12. The heating element 12, the wires 13, the thermostat 14 and a portion of the supply cable 16 are placed inside the waterproof housing 18, which has an opening (not shown) at one end. The waterproof housing 18 usually comprises a glass tube. The opening in the waterproof housing 18 is sealed with the end cap 20, which is typically made from a rubber material. The end cap 20 has a first conduit 38 (shown in FIG. 4A) and a second conduit 40 (shown in FIG. 4A) that both extend through the end cap 20. The supply cable 16 passes through the first conduit 38 in the end cap 20, allowing the supply cable 16 to be electrically connected to an external power source (not shown). The temperature control 22, typically a knob, dial or button, is seated adjacent to the second conduit 40 in the end cap 20. The temperature control 22 is usually mechanically connected, by a plastic or metallic shaft 24 that passes through the second conduit 40 in the end cap 20, to the thermostat 14. The temperature control 22 allows a user to select or adjust the temperature the immersion heater 10 should maintain. For example, when the user turns or presses the temperature control 22, the shaft 24 respectively rotates or moves vertically to modify the thermostat 14. It will be understood by those of skill in the art that the temperature control 22 could alternatively be electrically connected to the thermostat 14, by replacing the shaft 24 with an electrical cable (not shown).

There are two general designs of conventional immersion heaters for use in heating and maintaining the temperature of water in aquariums. The first such design is illustrated in FIG. 2, in which like numerals are used to indicate like elements without a repeat of the description of the like elements for purposes of brevity. In this design, the upper part of the immersion heater 10 is not watertight because there is no watertight seal between the supply cable 16 and the first conduit 38 in the end cap 22 through which the supply cable 16 passes. The supply cable 16 is usually an SPT1 or SPT2 type cable, because such cables are pliable and relatively thin in cross-section. Even though this design is somewhat resistant to water splashes onto the top of the end cap 22, if the end cap 22 were submerged, water would seep through the first conduit 38 in the end cap 22 and inside the waterproof housing 18. This would create an obvious danger of electrocution to both the fish in the aquarium and the owner, who often has to place his hands in the aquarium water. To obviate this danger, the upper part of the immersion heater 10 is held above the maximum water level 28 of an aquarium 30 by a support 26. This design is disadvantageous in that the immersion heater 10 is only partially submersible and it is not aesthetically pleasing. This design also poses a safety risk in that the support 26 is rarely 100% dependable and it is therefore possible that the end cap 20 may touch the aquarium water.

The second conventional design is illustrated in FIG. 3, in which like numerals are again used to indicate like elements without a repeat of the description of the like elements for purposes of brevity. The immersion heater 10 of FIG. 3 is fully submersible. The supply cable 16 is a relatively large diameter, water-resistant cable having a circular cross section, such as an ST or SJT type cable. Those of skill in the art will appreciate that the circular cross section of the supply cable 16 allows a reliable watertight seal to be achieved between the supply cable 16 and the first conduit 38 in the end cap 20. A watertight seal is also formed between the shaft 24 attached to the temperature control 22 and the second conduit 40 of the end cap 20 in a manner well understood by those of ordinary skill in the art. For example, as shown in FIG. 4B, one or more raised sealing rings 41 can be formed on the interior surface of the second conduit 40. Then, when the shaft 24, which has a diameter that is approximately the same as the diameter of the second conduit 40, is inserted into and through the second conduit 40, an interference fit is formed between the shaft 24 and each of the sealing rings 41 creating a reliable watertight seal.

Even though the immersion heater 10 of FIG. 3 is fully submersible, the design is disadvantageous because the large diameter of the supply cable 16 requires a large end cap and thus a large diameter glass tube to be used as the waterproof housing 18. Such a design is not practical or aesthetically pleasing. Consumers of this type of product like immersion heaters to be discreet in the aquarium. Thus, the waterproof housing 18 should be as small as possible and also the supply cable 16 should be unobtrusive. Neither of these requirements is met by the design of FIG. 3. This design is also disadvantageous because large cables such as the ST or SJT type cables used for the supply cable 16 are rigid and hard to manipulate. For example, a water-resistant ST or SJT type cable can only be bent to produce a curve with a radius of approximately two centimeters. By contrast, a water-resistant SPT1 or SPT2 type cable can be bent to produce a curve with a radius of only three millimeters. The immersion heater 10 of this design is therefore difficult to position or move in an aquarium.

There is a need in the art for an immersion heater, and particularly those for heating and maintaining the temperature of water in aquariums, that is completely submersible but also has reduced dimensions and is thus practical and aesthetically pleasing to consumers. There is also a need for a completely submersible immersion heater that uses a thin, flexible supply cable that is both unobtrusive and easy to manipulate.

BRIEF SUMMARY OF THE INVENTION

Briefly stated, the present invention provides an immersion heater. The immersion heater includes a waterproof housing, an electric heating element, a thermostat, an end cap, a temperature control, a flexible, water-resistant power cable and a sheath. The waterproof housing has an opening at one end. The electric heating element is placed inside of the housing and generates a heat output. The thermostat is placed inside of the housing and is electrically connected to the heating element for regulating the heat output of the heating element. The end cap sealingly engages the opening in the housing to form a watertight seal between the end cap and the opening in the housing. The end cap has a first conduit and a second conduit that extend through the end cap from a first surface of the end cap outside of the housing to a second surface of the end cap inside of the housing. The temperature control is seated adjacent to the second conduit and controls the thermostat. The temperature control is operatively connected to the thermostat by a shaft extending through the second conduit. The shaft sealingly engages the second conduit to form a watertight seal between the shaft and the second conduit. The power cable, which has an outer surface, extends from outside of the housing through the first conduit and is electrically connected to the thermostat inside of the housing. The power cable supplies electrical power to the heating element. The sheath is molded onto the power cable and has an outer surface that is shaped to be complementarily received by the first conduit. The sheath forms a watertight seal with the outer surface of the supply cable and sealingly engages the first conduit to form a watertight seal between the sheath and the first conduit.

In another embodiment, the present invention provides an immersion heater. The immersion heater includes a waterproof housing, an electric heating element, a thermostat, a flexible, water-resistant power cable, an end cap and a temperature control. The waterproof housing has an opening at one end. The electric heating element is placed inside of the housing and generates a heat output. The thermostat is placed inside of the housing and is electrically connected to the heating element for regulating the heat output of the heating element. The power cable, which has an outer surface, extends from outside of the housing and is electrically connected to the thermostat inside of the housing. The power cable supplies electrical power to the heating element. The end cap is molded onto the power cable and sealingly engaging the opening in the housing to form a watertight seal between the end cap and the opening in the housing. The end cap forms a watertight seal with the outer surface of the supply cable. The end cap has a conduit that extends through the end cap from a first surface of the end cap outside of the housing to a second surface of the end cap inside of the housing. The temperature control is seated adjacent to the conduit and controls the thermostat. The temperature control is operatively connected to the thermostat by a shaft extending through the conduit. The shaft sealingly engages the conduit to form a watertight seal between the shaft and the conduit.

In yet another embodiment, the present invention provides a fully submersible immersion heater having reduced dimensions for heating and maintaining the water temperature of an aquarium. The immersion heater includes a glass tube, an electric heating element, a thermostat, an end cap, a temperature control, a flexible, water-resistant power cable and a sheath. The tube has an opening at one end. The electric heating element is placed inside of the tube and generates a heat output. The thermostat is placed inside of the tube and is electrically connected to the heating element for regulating the heat output of the heating element. The end cap sealingly engages the opening in the tube to form a watertight seal between the end cap and the opening in the tube. The end cap has a first conduit and a second conduit that extend through the end cap from a first surface of the end cap outside of the tube to a second surface of the end cap inside of the tube. The temperature control is seated adjacent to the second conduit and controls the thermostat. The temperature control is operatively connected to the thermostat by a shaft extending through the second conduit. The shaft sealingly engages the second conduit to form a watertight seal between the shaft and the second conduit. The power cable, which has an outer surface, extends from outside of the tube through the first conduit and is electrically connected to the thermostat inside of the tube. The power cable supplies electrical power to the heating element. The sheath is molded onto the power cable and has an outer surface that is shaped to be complementarily received by the first conduit. The sheath forms a watertight seal with the outer surface of the supply cable and sealingly engages the first conduit to form a watertight seal between the sheath and the first conduit.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings, like numerals are used to indicate like elements throughout.

In the drawings:

FIG. 3 is a front elevational view of a second prior art immersion heater;

FIG. 4A is an enlarged top plan view of an end cap for use in a conventional immersion heater;

FIG. 4B is a cross-section of the end cap shown in FIG. 4A taken along the line 4 of FIG. 4A;

DETAILED DESCRIPTION OF THE INVENTION

Certain terminology is used in the following description for convenience only, and is not limiting. The words "inward" and "outward" refer to directions toward and away from, respectively, for example, the geometric center of the immersion heater and parts thereof. The terminology includes the words above specifically mentioned, derivatives thereof and words of similar import.

Figure 1:
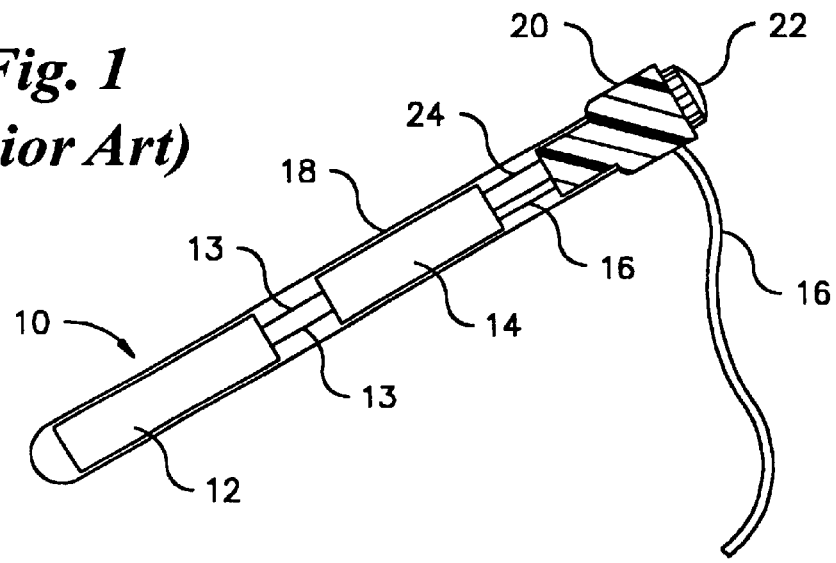
FIG. 1 is a front perspective view of a conventional immersion heater.
Figure 6:
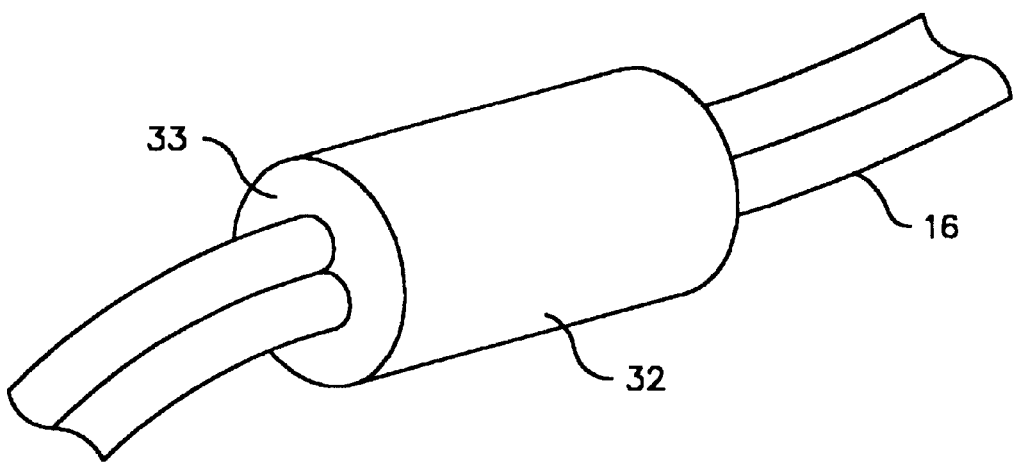
FIG. 6 is an enlarged partial front perspective view of a supply cable for use in an immersion heater according to the present invention.
Figure 7:
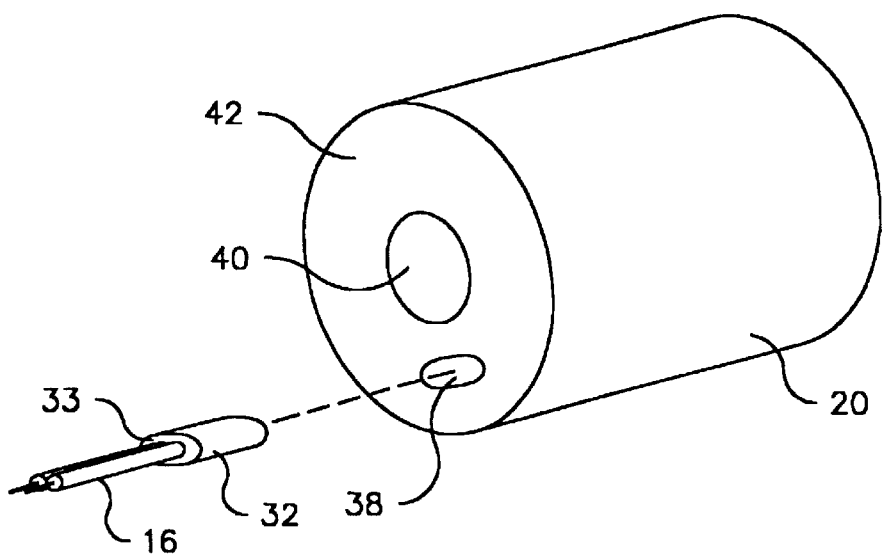
FIG. 7 is an enlarged partial front perspective view, partially exploded, of a supply cable and end cap for use in an immersion heater according to the present invention.
Figure 8:
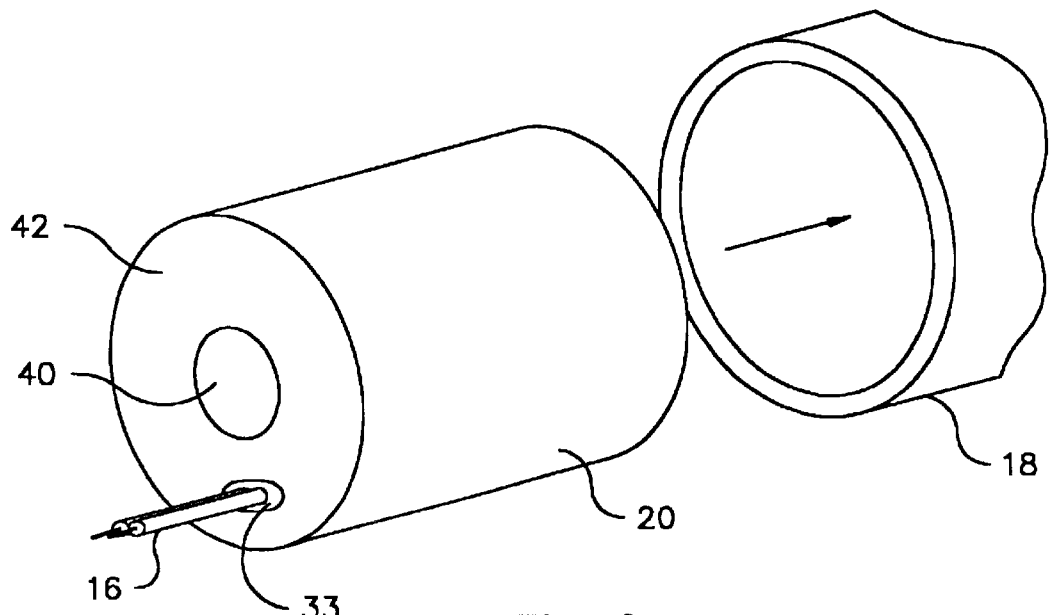
FIG. 8 is an enlarged partial front perspective view, partially exploded, of a supply cable, end cap and waterproof housing for use in an immersion heater according to the present invention.

The immersion heater of the present invention contains the elements of a conventional immersion heater as shown in FIG. 1, although with reduced dimensions. The immersion heater of the present invention also includes a sheath 32 as shown in FIGS. 6–8. While the immersion heater of the present invention is herein described as particularly useful for heating and maintaining the temperature of water in aquariums, it should be understood, based on this disclosure, that the immersion heater may be used in any application requiring the heating of a liquid and/or maintaining the temperature of a liquid by simply choosing the appropriate materials of construction for the individual components of the immersion heater.

Figure 5:
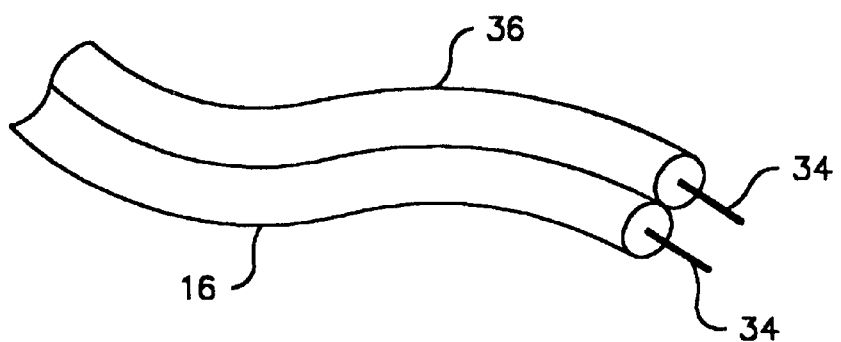
FIG. 5 is an enlarged partial front perspective view of a supply cable for use in an immersion heater according to the present invention.

The supply cable 16 of the present invention is thin and flexible, with a small geometrical cross section. As shown in FIG. 5, the supply cable 16 preferably contains two wires 34 completely covered by water-resistant insulation 36. It is possible, however, for the supply cable 16 to have more than two wires 34. For example, the supply cable 16 may contain a ground wire (not shown). Those of skill in the art will understand that the wires 34 can be made from any electrically conductive material and the water-resistant insulation 36 can be made from any water-resistant material that is an electrical insulator. Preferably, the supply cable 16 is an SPT1 or SPT2 type cable that is classified as being water-resistant.

Figure 2:
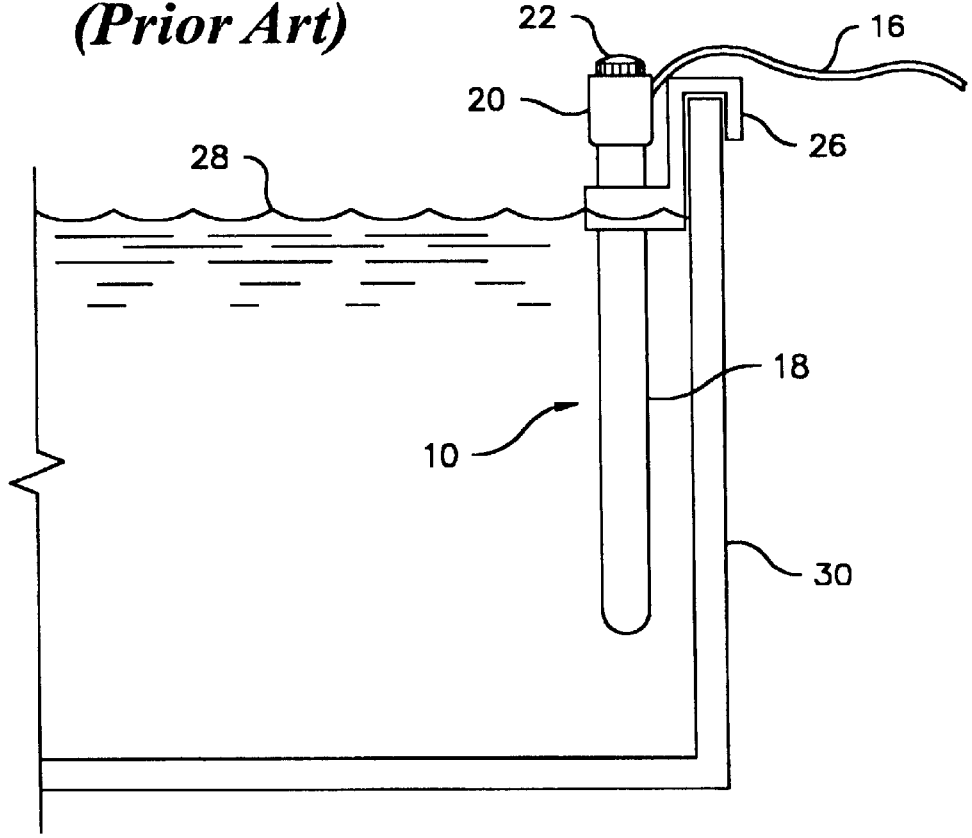
FIG. 2 is a front elevational view of a first prior art immersion heater.

As seen in FIG. 5, when the supply cable 16 is an SPT1 or SPT2 type cable, the supply cable 16 has an irregular cross-section, making it very difficult to use in a conventional immersion heater. In particular, the cross-section of the supply cable 16 is not a shape that is recognized by those of skill in the art as being reliable for watertight constructions. The difficulty of making a watertight seal with an SPT1 or SPT2 type cable is compounded by the fact that the extrusion tool used to produce such cables typically leaves irregularities (not shown) on the surface of the water-resistant insulation 36. Thus, even if it were possible to design a conduit to complementarily match the cross-section of the supply cable 16, the surface irregularities of the water-resistant insulation 36 would compromise any attempt to make a watertight seal. Thus, although SPT1 or SPT2 type cables have been used as supply cables in partially-submersible immersion heaters as shown in FIG. 2, which do not require a watertight seal between the supply cable 16 and the first conduit 38 of the end cap 20, such cables have not been previously used in fully-submersible immersion heaters.

To create a regular cross-section for the supply cable 16, and thus make it easier to create a watertight seal, the sheath 32 is molded onto the supply cable 16, as shown in FIG. 6. The sheath 32 has an inner end surface (not shown) and an outer end surface 33. The sheath 32 is preferably made from a polymeric material that forms a watertight seal with the outer surface of the supply cable 16 and yet does not damage the insulation 36 of the supply cable 16 when it is formed thereon. This polymeric material is also compressible, aiding the ability of the sheath 32 to form a watertight seal. In the preferred embodiment, the sheath 32 is constructed of an adhesive thermofusible copolyamide resin such as Thermelt 869. Those of skill in the art will understand, however, that the sheath can be made from any waterproof, moldable polymeric material, without departing from the spirit and scope of the invention. The sheath 32 is molded such that its outer surface, in cross-section, is uniform along the length of the sheath 32 and comprises any shape that is recognized by those of skill in the art as being reliable for watertight constructions, preferably a circular or oval shape. The cross-section of the sheath 32 can be any size, although it should preferably be kept as small as possible in order to minimize the size of the other components of the immersion heater. The length of the sheath 32 is preferably chosen to correspond to the depth of the end cap 20, which is usually about five millimeters, for watertightness efficiency. It will be understood by those of skill in the art, however, that the length of the sheath 32 can be any size so long as it is can form a reliable watertight seal with the first conduit 38 (shown in FIG. 7) of the end cap 20. The inner end surface and outer end surface 33 of the sheath 32 are preferably planar, although one of skill in the art will understand they could be any shapes, such as convex or concave hemispheres.

The stealth 32 is preferably molded onto the supply cable 16 using a low pressure and low temperature hot melt injection process. It should be understood by those skilled in the art, however, that other molding processes could be used so long as they do not damage or displace the water-resistant insulation 36 of the supply cable 16 and do not leave any weld marks or mold joints on the exterior surface of the sheath 32. Using the low pressure and low temperature mold process, the material to make the sheath 32 is preferably melted at about 200–210° C. and then is placed in a mold (not shown) with the supply cable 16. The mold is preferably maintained at a temperature of about 18–20° C. The temperature of the material when it contacts the supply cable 16 is about 90° C., which is approximately the maximum temperature that the supply cable 16 can be exposed to without damaging the water-resistant insulation 36 of the supply cable 16. The material cools very quickly, however, due to the small amount needed to form the sheath 32. The mold pressure is preferably about 1.5 to 2 bars so that there is no displacement of the water-resistant insulation 36 of the supply cable 16, which would cause variations in the cross-sectional thickness of the sheath 32 and thus hinder the ability of the sheath 32 to make a watertight seal. The low pressure also assures that there are no weld marks or mold joints on the outer surface of the sheath 32. The presence of such marks or joints would greatly reduce the ability of the sheath 32 to make a watertight seal. At pressures over about 3–4 bars, it is virtually impossible to avoid mold joints marks.

As previously described, and as shown in FIG. 7, the end cap 20 has a first conduit 38 and a second conduit 40 that both extend through the end cap 20 from the outer surface 42 of the end cap 20 to the inner surface of the end cap 20 (not shown). The cross-section of the first conduit 38 is designed to complementarily and sealingly receive the sheath 32. To assemble the immersion heater of the present invention, the supply cable 16 is inserted through the first conduit 38 until the portion of the supply cable 16 on which the sheath 32 has been molded reaches the first conduit 38. The cross section of the sheath 32 is preferably slightly larger than the cross-section of the first conduit 38 to form an interference fit when the sheath 32 is inserted into the first conduit 38. The sheath 32 is then preferably inserted into the first conduit 38 until the outer end surface 33 of the sheath 32 is flush with the outer surface 42 of the end cap 20, as shown in FIG. 8. As a result of the interference fit between the sheath 32 and the first conduit 38 and the compressible nature of the material of the sheath 32, a reliable watertight seal is formed between the sheath 32 and the first conduit 32. It will be understood by those of skill in the art that the sheath 32 only needs to be inserted into the first conduit 38 far enough to form a watertight seal between the sheath 32 and the end cap 20.

Although not shown, it will be understood by those of skill in the art that the shaft 24 attached to the temperature control 22 is inserted through the second conduit 40 of the end cap 20, with the temperature control 22 seated adjacent to the second conduit 40 of the end cap 20. A conventional watertight seal is formed between the shaft 24 and the second conduit 40 of the end cap 20 as discussed above in connection with FIGS. 3 & 4B.

The end-cap 20 is then attached to the waterproof housing 18, forming a watertight seal between the end cap 20 and the waterproof housing 18. Although any form of attachment is possible, the end cap 20 is preferably inserted into the open end of the waterproof housing 18. The cross-section of the end cap 20 is preferably slightly larger than the cross-section of the open end of the waterproof housing 18. In this manner, an interference fit is formed between the end cap 20 and the waterproof housing 18. As a result of the interference fit between the end cap 20 and the waterproof housing 18 and the compressible nature of the material of the end cap 20, a reliable watertight seal is formed between the end cap 20 and the waterproof housing 18. It will be understood by those of skill in the art that a sealant can be used to create a waterproof seal between the sheath 32 and the first conduit 38, or between the end cap 20 and the waterproof housing 18, rather than using an interference fit, without departing from the spirit or scope of the invention.

In addition to being unobtrusive, the thin supply cable 16 allows the end cap 20 of the immersion heater of the present invention to have a small diameter. Accordingly, the diameter of the waterproof housing 18 can also be small. As a result, the immersion heater of the present invention can have reduced dimensions (and thus be practical and aesthetically pleasing to consumers) and still be fully submersible. The thin, flexible supply cable 16 is also easily manipulated allowing the immersion heater to be readily placed or moved within an aquarium.

Figure 9:
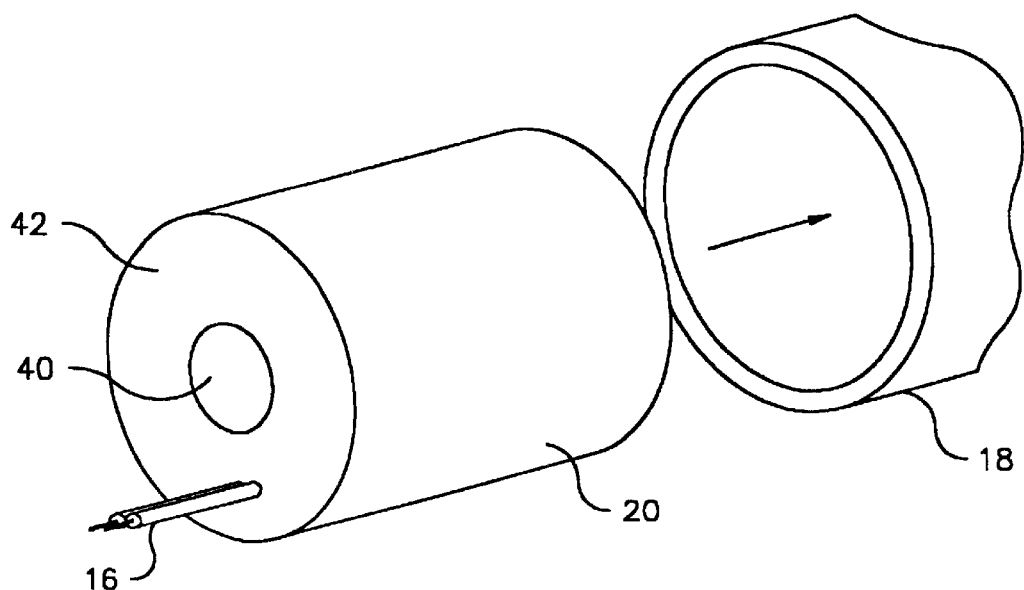
FIG. 9 is an enlarged partial front perspective view, partially exploded, of a supply cable, end cap and waterproof housing for use in an immersion heater according to the present invention.

It will be appreciated by those skilled in the art that changes could be made to the embodiments described above without departing from the broad inventive concept thereof. For example, as is shown in FIG. 9, the sheath 32 and end cap 20 can be combined into a single part by molding the entire end cap 20 directly onto the supply cable 16. It is understood, therefore, that this invention is not limited to the particular embodiment disclosed, but it is intended to cover modifications within the spirit and scope of the present invention.

What is claimed is:

1. A method of assembling a waterproof immersion heater, the method comprising:

providing a housing, a portion of the housing defining an opening;

placing an electric heating element inside of the housing for generating a heat output;

placing a thermostat inside of the housing in electrical communication with the heating element for regulating the heat output of the heating element;

sealingly engaging an end cap within the opening in the housing and forming a watertight seal between the end cap and the portion of the housing defining the opening, wherein the end cap has a first conduit and a second conduit that extends through the end cap from a first surface of the end cap outside of the housing to a second surface of the end cap inside of the housing;

placing a temperature control adjacent to the second conduit and operatively connecting the temperature control to the thermostat by a snaft extending through the second conduit;

sealingly engaging the shaft with the second conduit and forming a watertight seal between the shaft and the second conduit;

molding a sheath onto a flexible, water-resistant power cable, such that the sheath forms a watertight seal with an outer surface of the power cable, the sheath having an outer surface that is shaped to be complementarily positioned within the first conduit;

extending the power cable from outside of the housing through the first conduit and electrically connecting the power cable to the thermostat inside of the housing, the power cable for supplying electrical power to the heating element; and positioning the power cable within the first conduit such that the sheath sealingly engages the first conduit and forms a watertight seal between the sheath and the first conduit.

2. A method of assembling a waterproof immersion heater, the method comprising:

providing a housing, a portion of the housing defining an opening;

placing an electric heating element inside of the housing for generating a heat output;

placing a thermostat inside of the housing in electrical communication with the heating element for regulating the heat output of the heating element;

molding an end cap onto a flexible, water resistant power cable, such that the end cap forms a water tight seal with an outer surface of the power cable, the end cap having an outer surface that is shaped to be complementarily positioned within the opening of the housing, the end cap having a conduit that extends through the end cap from a first surface of the end cap outside of the housing to a second surface of the end cap inside of the housing;

placing a temperature control adjacent to the conduit and operatively connecting the temperature control to the thermostat by a shaft extending through the conduit;

sealingly engaging the shaft with the conduit and forming a watertight seal between the shaft and the conduit;

extending the power cable from outside of the housing through the conduit and electrically connecting the power cable to the thermostat inside of the housing, the power cable for supplying electrical power to the heating element;

positioning the end cap within the opening of the housing such that the end cap sealingly engages the portion of the housing defining the opening and forms a watertight seal between the end cap and the portion of the housing defining the opening.

* * * * *